US008976121B2

United States Patent
Hung et al.

(10) Patent No.: US 8,976,121 B2
(45) Date of Patent: *Mar. 10, 2015

(54) CAPACITIVE TOUCH SYSTEM AND CONTROL METHOD FOR A CAPACITIVE TOUCH SYSTEM

(75) Inventors: Tse-Lun Hung, Taipei (TW); Jung-Shou Huang, Da-an Shiang (TW); Hsin-Shieh Tsai, Yaunlin Town (TW)

(73) Assignee: ELAN Microelectronics Corporation, Hsinchu (TW)

( * ) Notice: Subject to any disclaimer, the term of this patent is extended or adjusted under 35 U.S.C. 154(b) by 283 days.

This patent is subject to a terminal disclaimer.

(21) Appl. No.: 12/385,099

(22) Filed: Mar. 31, 2009

(65) Prior Publication Data

US 2009/0251437 A1 Oct. 8, 2009

(30) Foreign Application Priority Data

Apr. 2, 2008 (TW) ................................ 97112057 A

(51) Int. Cl.
*G06F 3/041* (2006.01)
*G06F 3/044* (2006.01)

(52) U.S. Cl.
CPC ............... *G06F 3/044* (2013.01); *G06F 3/0416* (2013.01)
USPC ........................................ 345/173; 178/18.01

(58) Field of Classification Search
USPC ................... 345/156–179; 178/18.01
See application file for complete search history.

(56) References Cited

U.S. PATENT DOCUMENTS

| | | | | |
|---|---|---|---|---|
| 5,392,058 A * | 2/1995 | Tagawa | .......................... | 345/104 |
| 5,565,658 A * | 10/1996 | Gerpheide et al. | .......... | 178/18.02 |
| 6,118,433 A * | 9/2000 | Jenkin et al. | ................... | 345/173 |
| 7,663,607 B2 * | 2/2010 | Hotelling et al. | ............. | 345/173 |
| 2008/0042992 A1 * | 2/2008 | Kim | ................. | 345/173 |
| 2008/0062148 A1 * | 3/2008 | Hotelling et al. | ............. | 345/174 |
| 2008/0106526 A1 * | 5/2008 | Chen | .............................. | 345/174 |
| 2008/0158177 A1 * | 7/2008 | Wilson et al. | .................. | 345/173 |
| 2008/0162997 A1 * | 7/2008 | Vu et al. | .......................... | 714/27 |
| 2008/0238879 A1 * | 10/2008 | Jaeger et al. | ................... | 345/173 |
| 2009/0289908 A1 * | 11/2009 | Chen et al. | .................... | 345/173 |
| 2010/0039396 A1 * | 2/2010 | Ho et al. | ........................ | 345/173 |
| 2010/0283760 A1 * | 11/2010 | Leung et al. | ................... | 345/174 |
| 2010/0328237 A1 * | 12/2010 | Chang et al. | .................... | 345/173 |

FOREIGN PATENT DOCUMENTS

TW  I245253  12/2005

* cited by examiner

*Primary Examiner* — Kevin M Nguyen
*Assistant Examiner* — Mansour M Said
(74) *Attorney, Agent, or Firm* — Muncy, Geissler, Olds & Lowe, P.C.

(57) ABSTRACT

A capacitive touch system uses two or more integrated circuits to simultaneously scan a touch panel in such a manner that each of the integrated circuits scans only a portion of the touch panel to retrieve a respective detected data by itself. All the detected data are used for computation by one of the integrated circuits or one other than the integrated circuits to determine a touch information. This approach enables axis intersect projected capacitance touch integrated circuits applicable to a large scale touch panel, without degrading the frame rate of a capacitive touch system.

32 Claims, 9 Drawing Sheets

CAPACITIVE TOUCH SYSTEM AND CONTROL METHOD FOR A CAPACITIVE TOUCH SYSTEM

FIELD OF THE INVENTION

The present invention is related generally to a capacitive touch system and, more particularly, to a capacitive touch system using two or more integrated circuits (ICs) to scan a touch panel.

BACKGROUND OF THE INVENTION

In conventional applications, all the large scale capacitive touch panels use a surface capacitance sensing technique to scan thereto for determining a touch information, which uses a set of detecting currents, each directed to an endpoint of the large scale touch panel to produce detected values, and therefore, even multiple fingers simultaneously touch the large scale touch panel, this sensing technique still retrieves only one set of detected currents in response to this multi-finger touch. For this reason, the surface capacitance sensing technique can identify only one set of absolute coordinates. In a two dimensional matrix for instance, only one set of parameters (X,Y) will be determined, and thereby it can't implement a multi-finger touch detection.

An all points addressable (APA) projected capacitance sensing technique is capable of implementing a multi-finger touch detection, but not applicable to large scale touch panels because, to implement this sensing technique, it is necessary to charge and discharge each point sensor on the large scale touch panel. Taking a matrix-type touch panel for example, when the X and Y traces increase, the pixel number of an APA projected capacitance touch panel dramatically increases and thereby significantly degrades the frame rate of the touch panel due to the very long time period for scanning the large scale touch panel in a frame.

An axis intersect (AI) projected capacitance sensing technique is also capable of implementing a multi-finger touch detection, but not applicable to large scale touch panels, too. FIG. 1 is a schematic diagram of a conventional AI projected capacitance sensing technique applied to a small scale touch panel 10, in which an AI projected capacitance touch IC 12 is used to scan the small scale touch panel 10. Assuming that the AI projected capacitance touch IC 12 can support up to 22 traces, a good frame rate can be attained for a small scale touch panel 10 having ten X traces TRX1-TRX10 and ten Y traces TRY1-TRY10. However, if a this type touch IC 12 is applied to a large scale touch panel 14 having forty X traces TRX1-TRX40 and forty Y traces TRY1-TRY40, as shown in FIG. 2, the total number of traces that the touch IC 12 needs to scan dramatically increases. Unfortunately, the frame rate of the overall touch panel application is dependent to a very large extent on the time it takes the touch IC 12 to charge and discharge capacitors each time. In other words, the frame rate is determined mainly by the time in a frame that the touch IC 12 charges and discharges the capacitors. Hence, if an AI projected capacitance touch IC capable of scanning a greater number of traces is applied to a large scale touch panel 14, a major drawback would be a significantly decreased frame rate in the overall application, which leads to compromised performance at the application end.

Therefore, it is desired a sensing method applicable to large scale touch panels, capable of implementing a multi-finger touch detection thereto, and maintaining a good frame rate thereof.

SUMMARY OF THE INVENTION

An object of the present invention is to provide a capacitive touch system using two or more touch ICs to scan a touch panel and a control method for this capacitive touch system.

Another object of the present invention is to provide a capacitive touch system applicable to large scale touch panels, capable of implementing a multi-finger touch detection thereto, and maintaining a good frame rate thereof, and a control method for this capacitive touch system.

According to the present invention, a capacitive touch system includes a touch panel and two or more integrated circuits connected to the touch panel. Each of the integrated circuits scans only a portion of the touch panel to retrieve a respective detected data by itself, and then all the detected data are used for computation by one of the integrated circuits or one other than the integrated circuits, to determine a touch information. Since two or more integrated circuits simultaneously scan a touch panel for determining a touch information, a capacitive touch system can maintain a good frame rate, even for a large scale touch panel.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
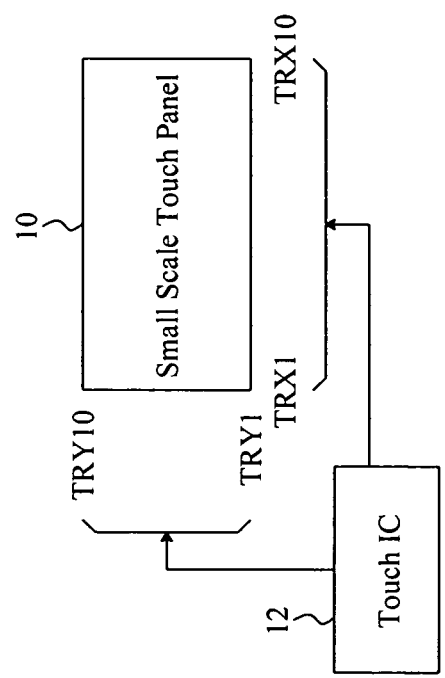
FIG. 1 is a schematic diagram of a conventional AI projected capacitance sensing technique applied to a small scale touch panel.
Figure 2:
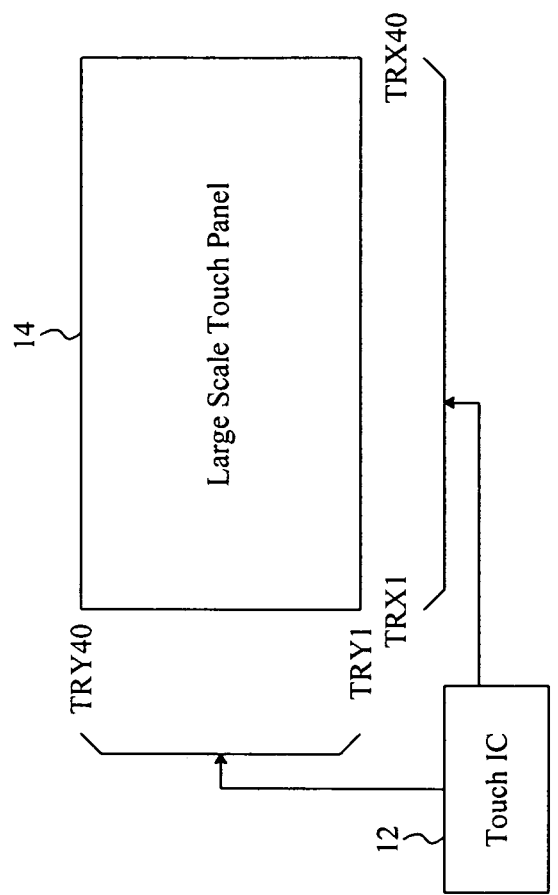
FIG. 2 is a schematic diagram of a conventional AI projected capacitance sensing technique applied to a large scale touch panel.
Figure 3:
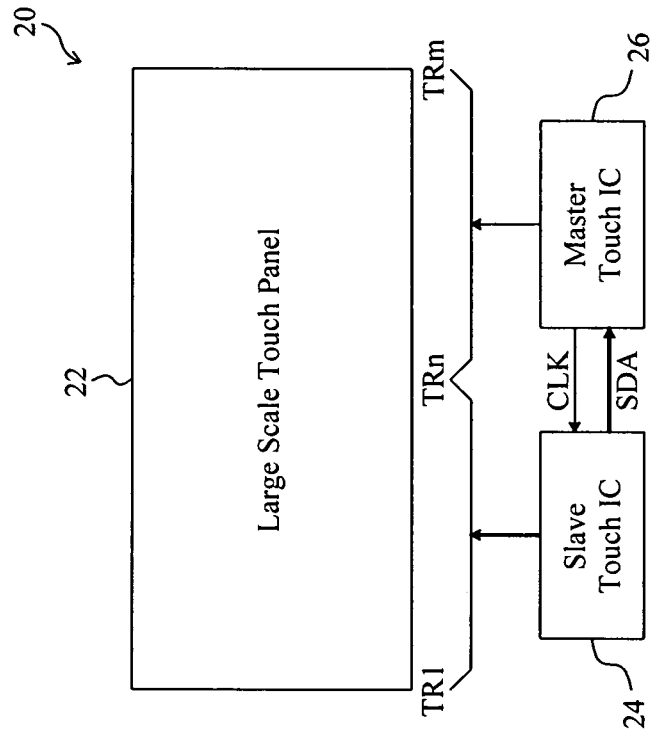
FIG. 3 is a schematic diagram of a first embodiment according to the present invention.

In a first embodiment according to the present invention, as shown in FIG. 3, a capacitive touch system 20 includes a large scale touch panel 22 and, to scan the large scale touch panel 22, two AI projected capacitance touch ICs 24 and 26 connected to the large scale touch panel 22 by m traces TR1-TRm, where m is a natural number. For the scan operation in a frame, the slave touch IC 24 scans from the trace TR1 to the trace TRn, and the master touch IC 26 scans from the trace TRn or TRn+1 to the trace TRm, where 1<n<m. Since each of the touch ICs 24 and 26 only scans a portion of the large scale touch panel 22, they can simultaneously scan their responsible traces in a frame. It is understood that the scanning sequence may be reversed so that the slave touch IC 24 scans from the trace TRn to the trace TR1, and the master touch IC 26 scans from the trace TRm to the trace TRn or TRn+1. The overall detected data of a touch on the large scale touch panel 22 is thus separated, retrieved by the touch ICs 24 and 26 respectively. In further detail, the slave touch IC 24 retrieves a first detected data by scanning the traces TR1-TRn, and the master touch IC 24 retrieves a second detected data by scanning the traces TRn-TRm or TRn+1-TRm. The touch ICs 24 and 26 are also connected to each other, and the master touch IC 26 sends a clock CLK to the slave touch IC 24 in order to collect the first detected data therefrom in a synchronous manner. Each time, after scanning, the slave touch IC 24 transmits its first detected data SDA to the master touch IC 26, where the first and second detected data are used for computation to determine a touch information which may include one or more touch positions on the large scale touch panel 22. In addition, the master touch IC 26 is also configured to coordinate the overall operation of the capacitive touch system 20 and responsible for external communications. In one embodiment, the slave touch IC 24 may be responsible for some computation to reduce the load of the master touch IC 26. For instance, the slave touch IC 24 may calculate with the detected values that it obtains from the scanning to the large scale touch panel 22 to produce the detected data SDA. Since the touch ICs 24 and 26 simultaneously scan their respective portions of the traces TR1-TRm in a frame, assuming m=40 and n=20, the forty traces of the large scale touch panel 22 is completely scanned once, only with the time it takes to scan twenty traces, thereby effectively improving the frame rate of the capacitive touch system 20.

Figure 4:
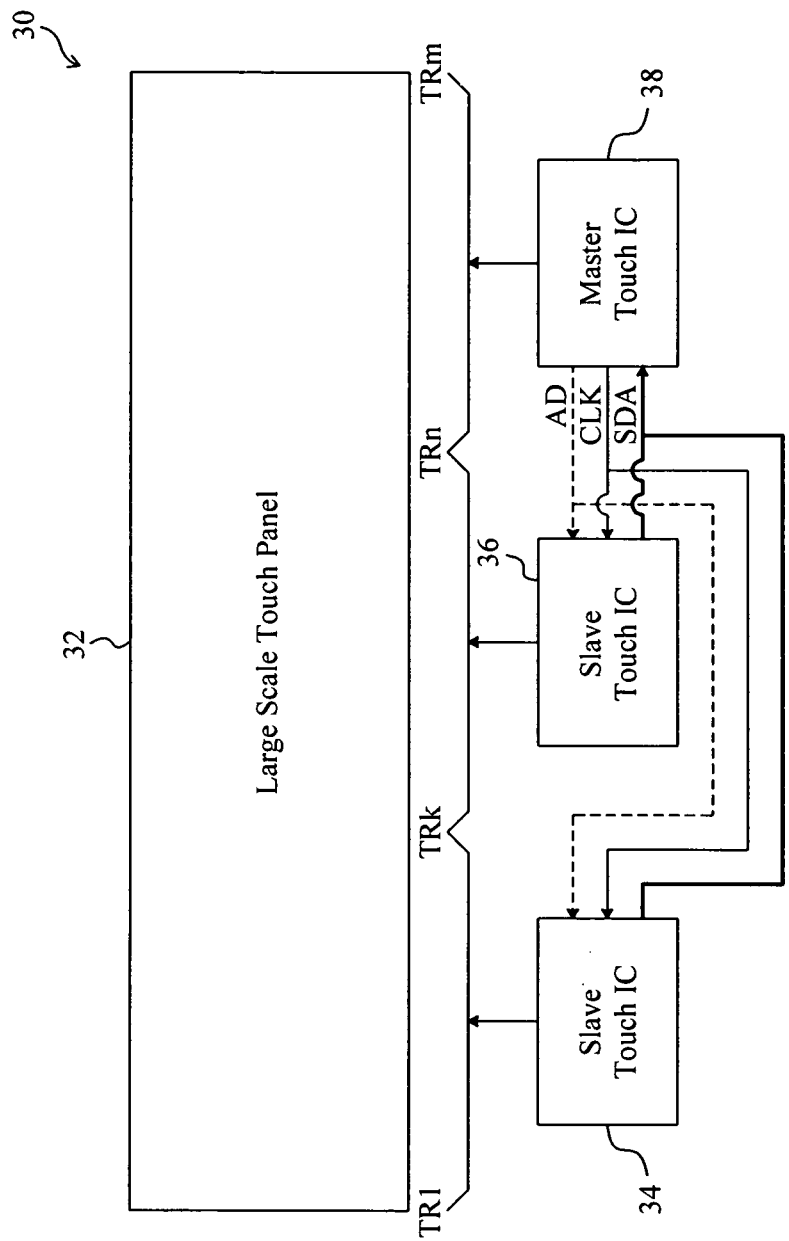
FIG. 4 is a schematic diagram of a second embodiment according to the present invention.

For more larger scale touch panel, FIG. 4 is a schematic diagram of a second embodiment according to the present invention, in which a capacitive touch system 30 uses three AI projected capacitance touch ICs 34, 36 and 38, one mater and two slave, to scan a large scale touch panel 32 by m traces TR1-TRm, where m is a natural number. For a frame, the slave touch IC 34 scans from the trace TR1 to the trace TRk, the slave touch IC 36 scans from the trace TRk or TRk+1 to the trace TRn, and the master touch IC 38 scans from the trace TRn or TRn+1 to the trace TRm, where 1<k<n<m. The slave touch ICs 34 and 36 are parallel connected to the master touch IC 38 that sends a clock CLK to each of the slave touch ICs 34 and 36 and selects therebetween with an address signal AD to request for detected data therefrom. Each time, after scanning, the slave touch ICs 34 and 36 transmit their respective detected data SDA to the master touch IC 38 where to execute final computation with the detected data SDA received from the slave touch ICs 34 and 36 and the detected data obtained by the master touch IC 38 scanning the large scale touch panel 32, determine a touch information which may include one or more touch positions on the large scale touch panel 32. Additionally, the master touch IC 38 is also configured to coordinate the overall operation of the capacitive touch system 30 and responsible for external communications. In addition to scan the large scale touch panel 32, each of the slave touch ICs 34 and 36 may also be responsible for some computation to reduce the load of the master touch IC 38, e.g. calculation with its detected values to produce its detected data SDA. Since the touch ICs 34, 36 and 38 simultaneously scan their respective portions of the traces TR1-TRm in a frame, the frame rate of the capacitive touch system 30 can be effectively improved, only about a third times of that by using only one touch IC to scan the large scale touch panel 32.

Figure 5:
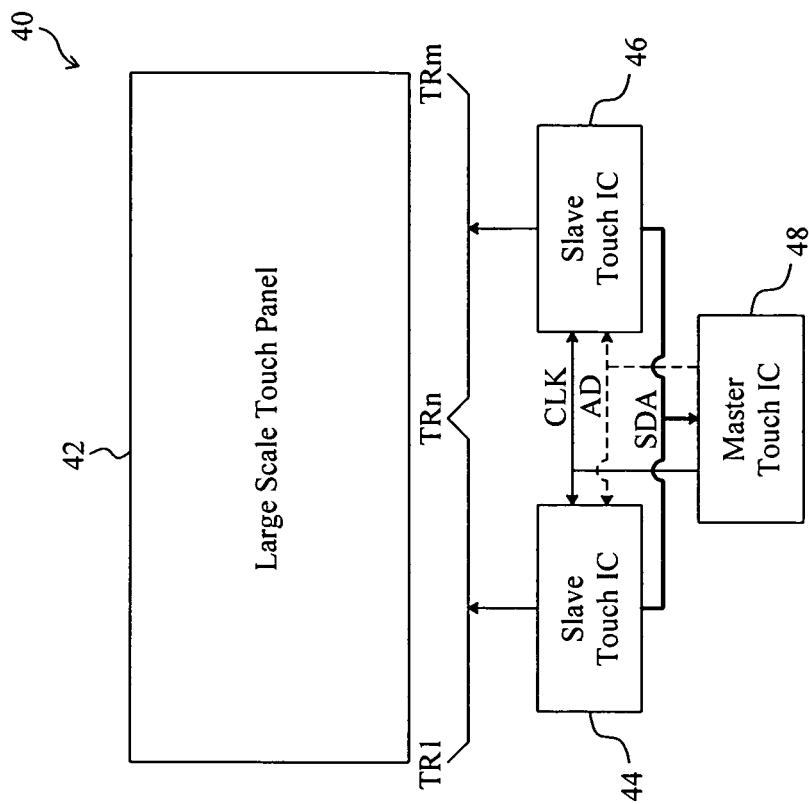
FIG. 5 is a schematic diagram of a third embodiment according to the present invention.

Alternatively, FIG. 5 is a schematic diagram of a third embodiment according to the present invention, in which a capacitive touch system 40 includes two slave touch ICs 44 and 46 to scan a large scale touch panel 42 by traces TR1-TRm, and a master touch IC 48 for computation with the detected data retrieved by the slave touch ICs 44 and 46 to determine a touch information. In this embodiment, all the touch ICs 44, 46 and 48 are AI projected capacitance touch ICs, but the master touch IC 48 does not directly scan the large scale touch panel 42. In a frame, the slave touch IC 44 scans from the trace TR1 to the trace TRn and the slave touch IC 46 scans from the trace TRn or TRn+1 to the trace TRm. Although the master touch IC 48 does not participate in scanning, it is still configured to receive the detected data from the slave touch ICs 44 and 46, carry on the final computation with all the detected data to determine a touch information, coordinate the overall operation of the capacitive touch system 40, and be responsible for external communications. For request of detected data, the master touch IC 48 sends a clock CLK to the slave touch ICs 44 and 46 and selects therebetween with an address signal AD. Each time, after scanning, the slave touch ICs 44 and 46 transmit their detected data SDA to the master touch IC 48 where final computation with the detected data SDA is executed and one or more touch positions on the touch panel 42 could be identified. In addition to scan the large scale touch panel 42, each of the slave touch ICs 44 and 46 may also execute some computation to reduce the load of the master touch IC, e.g. calculation with its detected values to produce its detected data SDA. Since the slave touch ICs 44 and 46 simultaneously scan their respective portions of the traces TR1-TRm in a frame, the frame rate of the capacitive touch system 40 can be effectively improved, only about a half of that by using only one touch IC to scan the large scale touch panel 42. Since the master touch IC 48 does not directly scan the large scale touch panel 42, in other embodiments, it may use another type IC instead of the AI projected capacitance touch IC.

Figure 6:
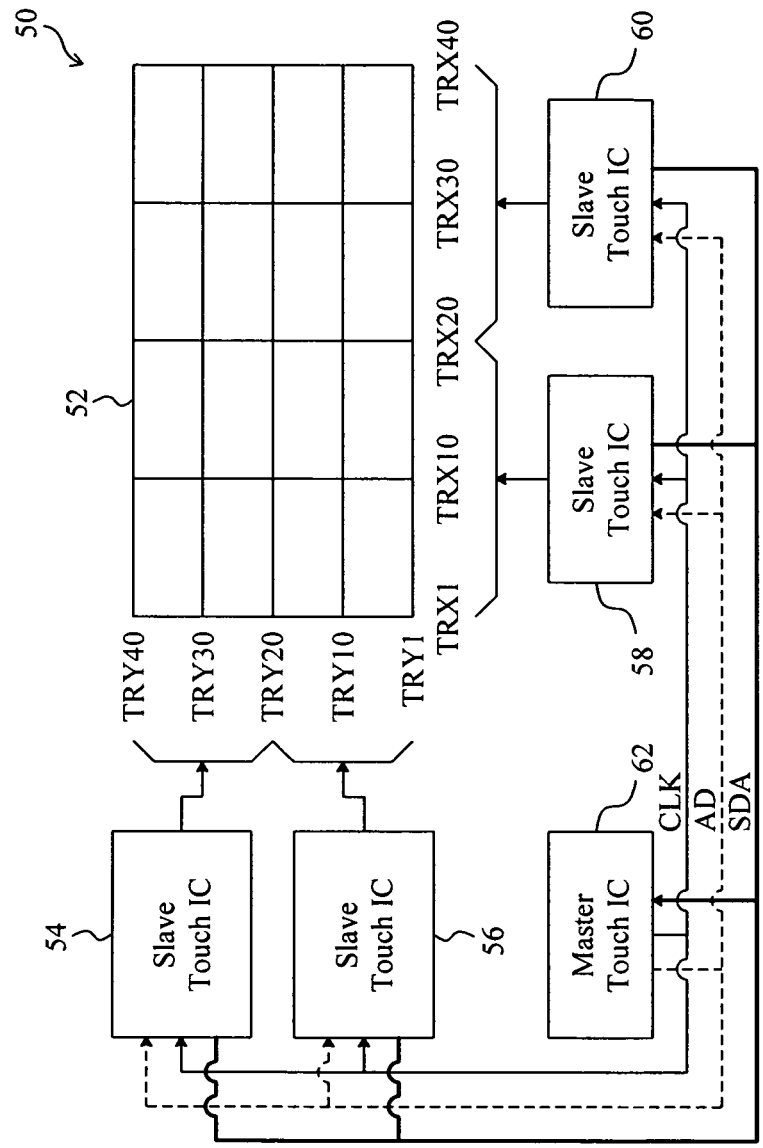
FIG. 6 is a schematic diagram of a fourth embodiment according to the present invention.

FIG. 6 is a schematic diagram of a fourth embodiment according to the present invention, in which a capacitive touch system 50 includes a large scale touch panel 52 and five touch ICs 54, 56, 58, 60 and 62. All the slave touch ICs 54-60 are AI projected capacitance touch ICs, while the master touch IC 62 is either an AI projected capacitance touch IC or an another type IC. In this embodiment, the scanning to the X traces and the Y traces is split, two of the slave touch ICs, i.e. 54 and 56, are arranged on the left side of the large scale touch panel 52, and the other two 58 and 60 are arranged on the bottom side of the large scale touch panel 52. The large scale touch panel 52 has forty X traces TRX1-TRX40 and forty Y traces TRY1-TRY40. The slave touch IC 54 is located above the slave touch IC 56 and the slave touch IC 58 is located on the left side of the slave touch IC 60. For the scanning in a frame, the slave touch IC 58 scans from the trace TRX1 to the trace TRX20, the slave touch IC 60 scans from the trace TRX20 or TRX21 to the trace TRX40, the slave touch IC 56 scans from the trace TRY1 to the trace TRY20, and the slave touch IC 54 scans from the trace TRY20 or TRY21 to the trace TRY40. The master touch IC 62 does not participate in scanning but is configured to receive all the detected data retrieved by the slave touch ICs 54-60, calculate with all the detected data to determine a touch information, coordinate the overall operation of the capacitive touch system 50, and be responsible for external communications. For request of the detected data, the master touch IC 62 sends a clock CLK to the slave touch ICs 54-60 and selects therebetween with an address signal AD. Each time, after scanning, the slave touch ICs 54-60 transmit their detected data SDA to the master touch IC 62 where final computation is executed with all the detected data SDA and one or more touch positions on the large scale touch panel 52 could be identified. In addition to scan the large scale touch panel 52, each of the slave touch ICs 54-60 may also be responsible for some computation to reduce the load of the master touch IC 62, e.g. calculation with its detected values to produce its detected data SDA. Since the four slave touch ICs 54-60 simultaneously scan their respective portions of the traces TRX1-TRX40 and TRY1-TRY40 in a frame, the frame rate of the capacitive touch system 50 can be effectively improved, only about a fourth times of that by using only one touch IC to scan the large scale touch panel 52.

Figure 7:
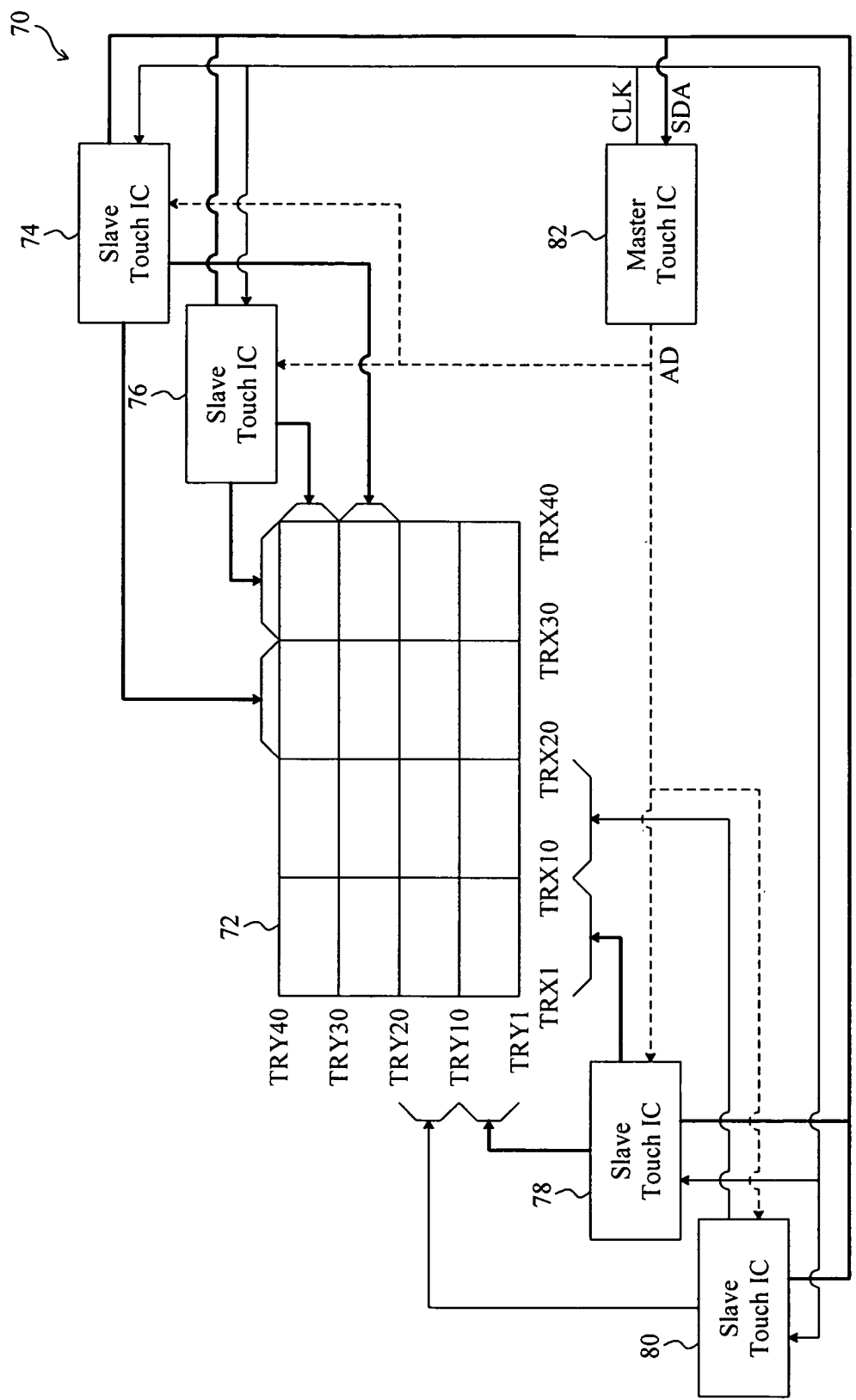
FIG. 7 is a schematic diagram of a fifth embodiment according to the present invention.

Alternatively, FIG. 7 is a schematic diagram of a fifth embodiment according to the present invention, in which four slave touch ICs 74, 76, 78 and 80 are used to scan a large scale touch panel 72 having forty X traces TRX1-TRX40 and forty traces TRY1-TRY40. Each of the slave touch ICs 74-80 is an AI projected capacitance touch IC, and is responsible for scanning a portion of the X traces TRX1-TRX40 and a portion of the Y traces TRY1-TRY40 to retrieve a respective detected data. The slave touch ICs 74 and 76 are arranged on the upper right corner of the large scale touch panel 72, and the slave touch ICs 78 and 80 are arranged on the lower left corner of the touch panel 72. In further detail, the slave touch IC 74 is located on the upper right corner of the slave touch IC 76, and the slave touch IC 78 is located on the upper right corner of the slave touch IC 80. The slave touch IC 78 scans the traces TRX1-TRX10 and TRY1-TRY10, the slave touch IC 80 scans the traces TRX11-TRX20 and TRY11-TRY20, the slave touch IC 74 scans the traces TRX21-TRX30 and TRY21-TRY30, and the slave touch IC 76 scans the traces TRX31-TRX40 and TRY31-TRY40. A master touch IC 82 does not participate in scanning but is configured to receive all the detected data from the slave touch ICs 74-80, calculate with all the detected data to determine a touch information, coordinate the overall operation of the capacitive touch system 70, and be responsible for external communications. For request of the detected data, the master touch IC 82 sends a clock CLK to the slave touch ICs 74-80 and selects therebetween with an address signal AD. Each time, after scanning, the slave touch ICs 74-80 transmit their detected data SDA to the master touch IC 82 where final computation is executed with all the detected data SDA and one or more touch positions on the large scale touch panel 72 could be identified. In addition to scan the large scale touch panel 72, each of the slave touch ICs 74-80 may also be responsible for some computation to reduce the load of the master touch IC 82, e.g. calculation with its detected values to produce its detected data SDA. Since the four slave touch ICs 74-80 simultaneously scan their respective portions of the traces TRX1-TRX40 and TRY1-TRY40 in a frame, the frame rate of the capacitive touch system 70 can be effectively improved, only about a fourth times of that by using only one touch IC to scan the large scale touch panel 72. The master touch IC 82 is either an AI projected capacitance touch IC or an another type IC.

Figure 8:
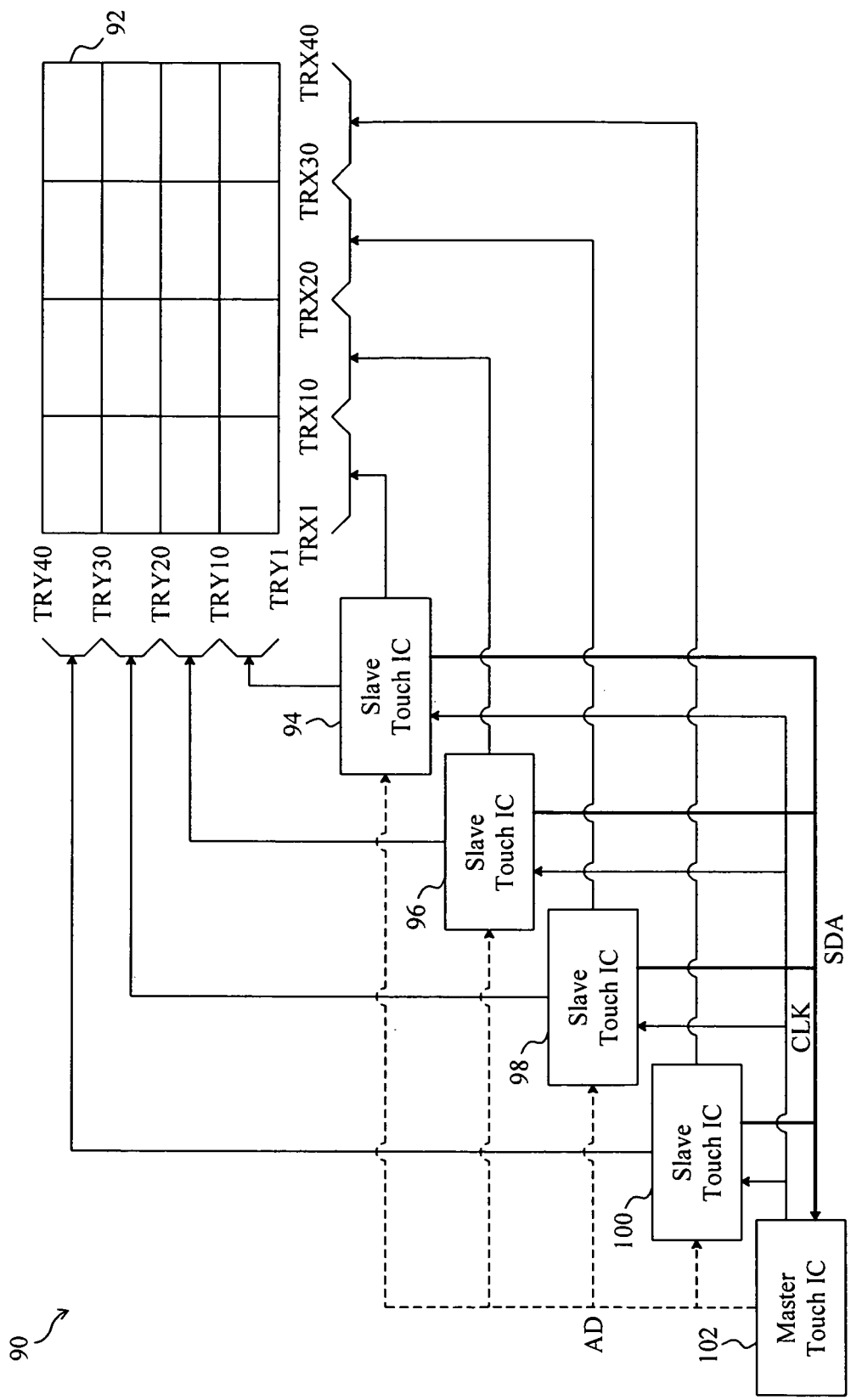
FIG. 8 is a schematic diagram of a sixth embodiment according to the present invention.

Alternatively, FIG. 8 is a schematic diagram of a sixth embodiment according to the present invention, in which a capacitive touch system 90 includes a large scale touch panel 92 having forty X traces TRX1-TRX40 and forty Y traces TRY 1-TRY40, and five touch ICs 94, 96, 98, 100 and 102 arranged on the lower left corner of the large scale touch panel 92 in such a manner that the slave touch IC 94 is on the upper right corner of the slave touch IC 96, the slave touch IC 96 is on the upper right corner of the slave touch IC 98, the slave touch IC 98 is on the upper right corner of the slave touch IC 100, and the slave touch IC 100 is on the upper right corner of the master touch IC 102. Each of the slave touch ICs 94-100 is an AI projected capacitance touch IC, and the master touch IC is either an AI projected capacitance touch IC or an another type IC. The slave touch IC 94 scans the traces TRX1-TRX10 and TRY1-TRY10, the slave touch IC 96 scans the traces TRX11-TRX20 and TRY11-TRY20, the slave touch IC 98 scans the traces TRX21-TRX30 and TRY21-TRY30, and the slave touch IC 100 scans the traces TRX31-TRX40 and TRY31-TRY40. Each of the slave touch ICs 94-100 retrieves a respective detected data by itself, and sends it to the master touch IC 102. The master touch IC 102 does not participate in scanning but is configured to receive all the detected data from the slave touch ICs 94-100, calculate with all the detected data to determine a touch information, coordinate the overall operation of the capacitive touch system 90, and be responsible for external communications. For request of the detected data, the master touch IC 102 sends a clock CLK to the slave touch ICs 94-100 and selects therebetween with an address signal AD. Each time, after scanning, the slave touch ICs 94-100 transmit their detected data SDA to the master touch IC 102 where final computation is executed with all the detected data SDA and one or more touch positions on the large scale touch panel 92 could be identified. In addition to scan the large scale touch panel 92, each of the slave touch ICs 94-100 may also be responsible for some computation to reduce the load of the master touch IC 102, e.g. calculation with its detected values to produce its detected data SDA. Since the four slave touch ICs 94-100 simultaneously scan their respective portions of the traces TRX1-TRX40 and TRY1-TRY40 in a frame, the frame rate of the capacitive touch system 90 can be effectively improved, only about a fourth times of that by using only one touch IC to scan the large scale touch panel 92. The master touch IC 102 is either an AI projected capacitance touch IC or an another type IC.

Figure 9:
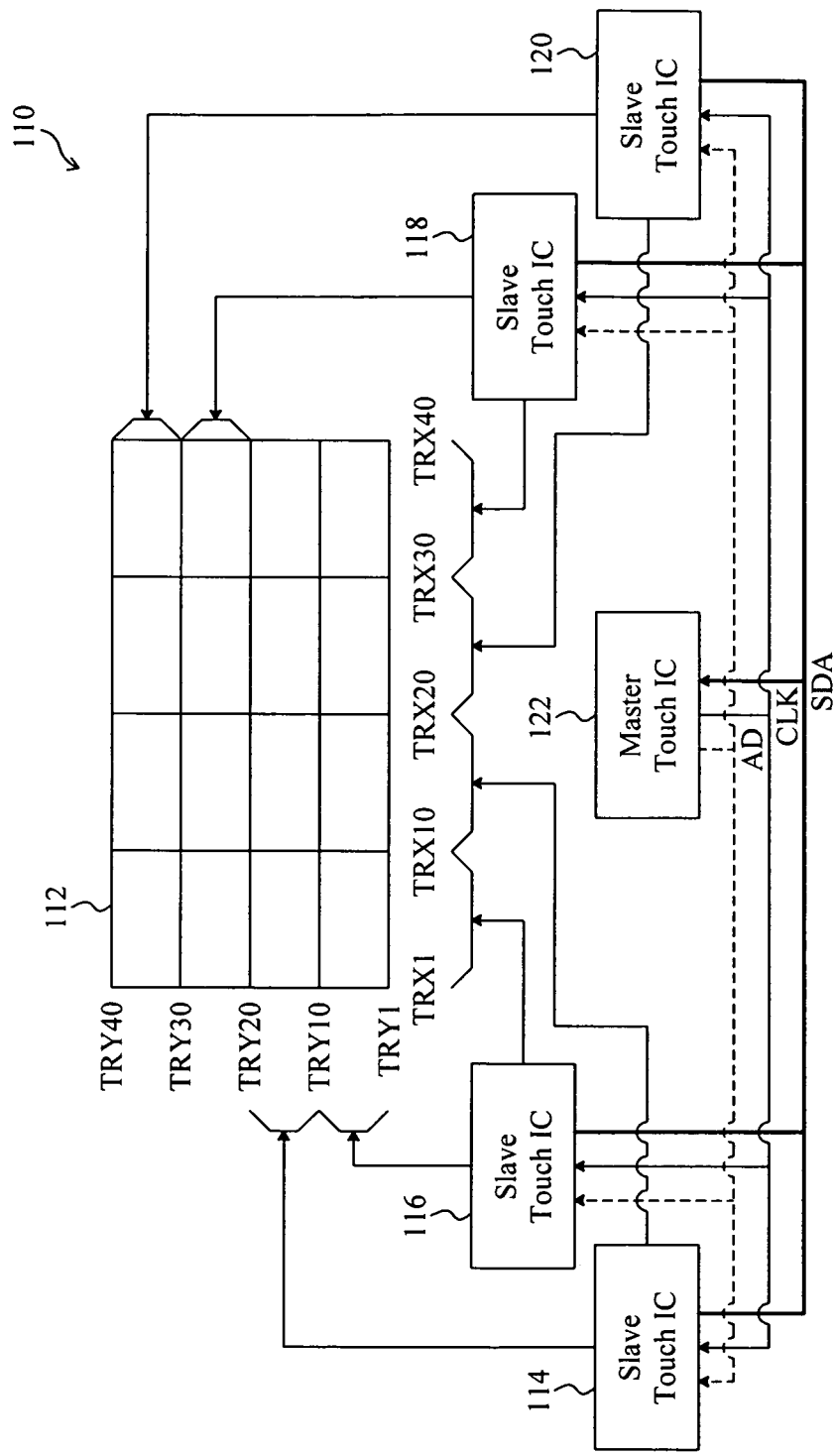
FIG. 9 is a schematic diagram of a seventh embodiment according to the present invention.

FIG. 9 is a schematic diagram of a seventh embodiment according to the present invention, in which a capacitive touch system 110 includes a large scale touch panel 112 and five touch ICs 114, 116, 118, 120 and 122. The slave touch ICs 114 and 116 are arranged on the lower left corner of the large scale touch panel 112, and the slave touch ICs 118 and 120 are on the lower right corner of the large scale touch panel 112. In further detail, the slave touch IC 114 is on the lower left corner of the slave touch IC 116, and the slave touch IC 118 is on the upper left corner of the slave touch IC 120. The large scale touch panel 112 has forty X traces TRX1-TRX40 and forty Y traces TRY1-TRY40. The slave touch IC 116 scans the traces TRX1-TRX10 and TRY1-TRY10, the slave touch IC 114 scans the traces TRX11-TRX20 and TRY11-TRY20, the slave touch IC 120 scans the traces TRX21-TRX30 and TRY31-TRY40, and the slave touch IC 118 scans the traces TRX31-7TRX40 and TRY21-TRY30. Each of the slave touch ICs 116-120 is an AI projected capacitance touch IC and retrieves a respective detected data to send to the master touch IC 122. The master touch IC 122 does not participate in scanning but is configured to receive all the detected data from the slave touch ICs 114-120, calculate with all the detected data to determine a touch information, coordinate the overall operation of the capacitive touch system 110, and be responsible for external communications. For request of the detected data, the master touch IC 122 sends a clock CLK to the slave touch ICs 114-120 and selects therebetween with an address signal AD. Each time, after scanning, the slave touch ICs 114-120 transmit their detected data SDA to the master touch IC 122 where final computation is executed with all the detected data SDA and one or more touch positions on the large scale touch panel 112 could be identified. In addition to scan the large scale touch panel 112, each of the slave touch ICs 114-120 may also be responsible for some computation to reduce-the load of the master touch IC 122, e.g. calculation with its detected values to produce its detected data SDA. Since the slave touch ICs 114-120 simultaneously scan their respective portions of the traces TRX1-

TRX40 and TRY1-TRY40 in a frame, the frame rate of the capacitive touch system 110 can be effectively improved, only about a fourth times of that by using only one touch IC to scan the large scale touch panel 112. The master touch IC 122 is either an AI projected capacitance touch IC or an another type IC.

FIGS. 6-9 demonstrate four configurations of a capacitive touch system according to the present invention. As the locations of the slave touch ICs vary, the wire length between the traces and the slave touch ICs also vary, which may influence the performance of a capacitive touch system. Furthermore, in FIGS. 5-9, the master touch ICs 48, 62, 82, 102 and 112, which are not responsible for scanning the touch panels, are not necessarily implemented by capacitive touch ICs and may be replaced by general ICs. Moreover, in FIGS. 3-9, the AI projected capacitance touch ICs may also be replaced by other projected capacitance touch ICs, such as the APA projected capacitance touch ICs.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touch system, comprising:
a touch panel formed of a single panel having a plurality of traces;
at least a first integrated circuit connected to the touch panel formed of a single panel, the first integrated circuit scanning a first portion of the touch panel by charging or discharging the traces of the first portion to retrieve first detected data; and
a second integrated circuit connected to the touch panel formed of a single panel and the at least a first integrated circuit, the second integrated circuit scanning a second portion of the touch panel by charging or discharging the traces of the second portion to retrieve a second detected data, receiving all the first detected data from the at least a first integrated circuit, and calculating with all the first detected data retrieved by the at least a first integrated circuit and the second detected data retrieved by the second integrated circuit to determine a touch information;
wherein the at least a first integrated circuit and the second integrated circuit simultaneously scan the respective first and second touch panel portions to increase a frame rate of the capacitive touch system.

2. The capacitive touch system of claim 1, wherein the at least a first integrated circuit comprises an axis intersect projected capacitance touch integrated circuit.

3. The capacitive touch system of claim 1, wherein the at least a first integrated circuit produces first detected data by calculating with its detected values.

4. The capacitive touch system of claim 1, wherein the second integrated circuit comprises an axis intersect projected capacitance touch integrated circuit.

5. The capacitive touch system of claim 1, wherein the second integrated circuit coordinates the overall operation of the capacitive touch system.

6. The capacitive touch system of claim 1, wherein the second integrated circuit is responsible for external communications.

7. A control method for a capacitive touch system including a touch panel having a plurality of traces, comprising:
scanning the touch panel formed of a single panel by at least a first integrated circuit and a second integrated circuit in such a manner that the at least a first integrated circuit scans a first portion of the touch panel formed of a single panel by charging or discharging the traces of the first portion to retrieve a first detected data, and the second integrated circuit scans a second portion of the touch panel formed of a single panel by charging or discharging the traces of the second portion to retrieve a second detected data;
transmitting all the first detected data to the second integrated circuit; and
processing the first detected data retrieved by the at least a first integrated circuit and the second detected data retrieved by the second integrated circuit to determine a touch information,
wherein the at least a first integrated circuit and the second integrated circuit simultaneously scan the respective first and second touch panel portions to increase a frame rate of the capacitive touch system.

8. The control method of claim 7, wherein each of the at least a first integrated circuit produces the detected data by processing detected values generated by the scanning of the first touch panel portion.

9. The control method of claim 7, further comprising performing external communications by the second integrated circuit.

10. The control method of claim 7, further comprising coordinating the overall operation of the capacitive touch system by the second integrated circuit.

11. A capacitive touch system, comprising:
a touch panel formed of a single panel having a plurality of traces;
a plurality of first integrated circuits connected to the touch panel formed of a single panel, each of the plurality of first integrated circuits scanning a respective portion of the touch panel by charging or discharging the traces of the respective portion to retrieve detected data corresponding thereto; and
a second integrated circuit connected to the plurality of first integrated circuits, receiving all the detected data therefrom, and processing the detected data to determine touch information;
wherein the plurality of first integrated circuits simultaneously scan the respective touch panel portions to increase a frame rate of the capacitive touch system.

12. The capacitive touch system of claim 11, wherein each of the plurality of first integrated circuits comprises an axis intersect projected capacitance touch integrated circuit.

13. The capacitive touch system of claim 11, wherein each of the plurality of first integrated circuits produces the detected data by processing detected values generated by the scanning of the touch panel portion corresponding thereto.

14. The capacitive touch system of claim 11, wherein the second integrated circuit comprises an axis intersect projected capacitance touch integrated circuit.

15. The capacitive touch system of claim 11, wherein the second integrated circuit coordinates the overall operation of the capacitive touch system.

16. The capacitive touch system of claim 11, wherein the second integrated circuit is responsible for external communications.

17. A control method for a capacitive touch system including a touch panel having a plurality of traces, comprising:
scanning the touch panel formed of a single panel by a plurality of first integrated circuits in such a manner that each of the plurality of first integrated circuits scans a respective portion of the touch panel by charging or discharging the traces of the respective portion to retrieve a respective detected data;

transmitting all the detected data to a second integrated circuit; and processing the detected data by the second integrated circuit to determine touch information;

wherein the plurality of first integrated circuits simultaneously scan the respective touch panel portions to increase a frame rate of the capacitive touch system.

18. The control method of claim 17, wherein each of the plurality of first integrated circuits produces the detected data by processing detected values generated by the scanning of the touch panel corresponding thereto.

19. The control method of claim 17, further comprising performing external communications by the second integrated circuit.

20. The control method of claim 17, further comprising coordinating the overall operation of the capacitive touch system by the second integrated circuit.

21. A combination of capacitive touch circuits for scanning a touch panel, comprising:

at least a first integrated circuit connected to the touch panel formed of a single panel; and a second integrated circuit connected to the touch panel formed of a single panel and the at least a first integrated circuit;

wherein the at least a first integrated circuit and the second integrated circuit operate in parallel to perform a touch detection for the touch panel formed of a single panel to retrieve first detected data and second detected data, respectively, and wherein the second integrated circuit receives all the first detected data from the at least a first integrated circuit and calculates with the first detected data and the second detected data retrieved by the second integrated circuit to determine a touch information.

22. The combination of capacitive touch circuits of claim 21, wherein each of the at least a first integrated circuit comprises an axis intersect projected capacitance touch integrated circuit.

23. The combination of capacitive touch circuits of claim 21, wherein each of the at least a first integrated circuit produces its detected data by calculating with its detected values.

24. The combination of capacitive touch circuits of claim 21, wherein the second integrated circuit comprises an axis intersect projected capacitance touch integrated circuit.

25. The combination of capacitive touch circuits of claim 21, wherein the second integrated circuit coordinates the overall operation of the capacitive touch system.

26. The combination of capacitive touch circuits of claim 21, wherein the second integrated circuit is responsible for external communications.

27. A combination of capacitive touch circuits for detecting a touch panel, comprising:

a plurality of first integrated circuits connected to the touch panel formed of a single panel, the plurality of first integrated circuits operating in parallel to perform a touch detection for the touch panel formed of a single panel to retrieve detected data corresponding thereto; and a second integrated circuit connected to the plurality of first integrated circuit, receiving all the detected data therefrom, and calculating with the detected data to determine a touch information;

wherein the plurality of first integrated circuits simultaneously scan respective touch panel portions to increase a frame rate of the capacitive touch system.

28. The combination of capacitive touch circuits of claim 27, wherein each of the plurality of first integrated circuits comprises an axis intersect projected capacitance touch integrated circuit.

29. The combination of capacitive touch circuits of claim 27, wherein each of the plurality of first integrated circuits produces its detected data by calculating with its detected values.

30. The combination of capacitive touch circuits of claim 27, wherein the second integrated circuit comprises an axis intersect projected capacitance touch integrated circuit.

31. The combination of capacitive touch circuits of claim 27, wherein the second integrated circuit coordinates the overall operation of the capacitive touch system.

32. The combination of capacitive touch circuits of claim 27, wherein the second integrated circuit is responsible for external communications.

* * * * *